2 Sheets--Sheet 1.

J. L. ROWLAND.

Manufacture of Artificial Stone.

No. 6,234. Reissued Jan. 12, 1875.

Witnesses
J. N. Campbell
James Martin Jr.

Inventor
James L. Rowland
by
Mann, Fenwick & Lawrence

THE GRAPHIC CO. PHOTO-LITH. 39 & 41 PARK PLACE, N.Y.

J. L. ROWLAND.

Manufacture of Artificial Stone.

No. 6,234. Reissued Jan. 12, 1875.

Witnesses
J. R. Campbell.
James Martin Jr.

Inventor
James L. Rowland
by
Mann, Brewick & Hammond

THE GRAPHIC CO. PHOTO-LITH. 39 & 41 PARK PLACE, N.Y.

UNITED STATES PATENT OFFICE.

JAMES L. ROWLAND, OF NEW YORK, N. Y.

IMPROVEMENT IN THE MANUFACTURE OF ARTIFICIAL STONE.

Specification forming part of Letters Patent No. 137,322, dated April 1, 1873; reissue No. 6,234, dated January 12, 1875; application filed January 8, 1875.

*To all whom it may concern:*

Be it known that I, JAMES L. ROWLAND, formerly of Milwaukee, county of Milwaukee and State of Wisconsin, but now of the city, county, and State of New York, have invented an Improvement in the Manufacture of Stone Artificially; and I do hereby declare that the following is a full, clear, and exact description thereof, reference being had to the accompanying drawings, in which—

Figure 1:
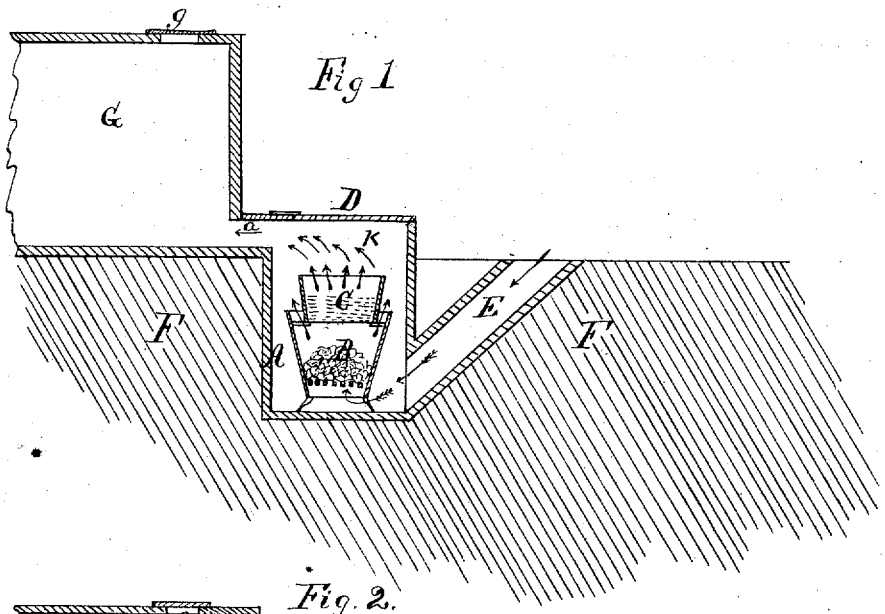
Figure 2:
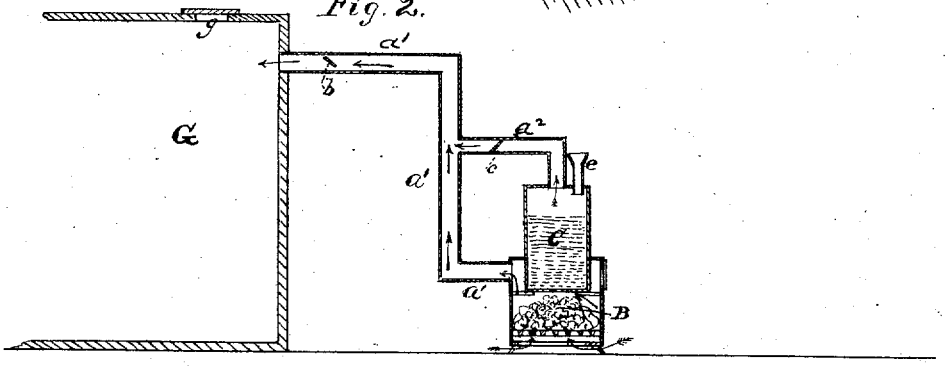

Figure 1, Plate 1, shows one form of apparatus for manufacturing stone artificially. Fig. 2, Plate 1, and Figs. 3 and 4, Plate 2, show modifications of Fig. 1.

Similar letters of reference indicate corresponding parts in the several figures.

This invention relates to an apparatus for the artificial treatment of lime, hydraulic cements, and other substances or combination of substances, which will harden and become stone when subjected to the action of carbonic-acid gas mingled with vapors of fluids, as will be hereinafter explained.

The following description of my invention will enable others skilled in the art to understand it.

In the accompanying drawings, Fig. 1, A represents a chamber or pit, which is constructed below the surface of the ground F, for the purpose of containing a carbonic-acid-gas generator, and a steam or vapor generator. The gas-generator B is a simple furnace, in which charcoal is burned, which furnace is supplied with air by means of an inclined passage, E. The furnace is open at its top, and supports, by means of lugs applied in any suitable manner, the boiler C, into which water is put for the purpose of generating vapor.

It will be seen that I here produce vapor by the heat of the same furnace in which the gas is generated. There is a space, K, between the boiler or evaporating-pan C and the hinged cover D of the pit A, in which the carbonic-acid gas and the watery particles will mix before they enter an apartment, G, which they do through a short passage, *a*, as indicated by the arrows in Fig. 1. The material to be hardened is put into the chamber G and here subjected to the action of the gas, which it absorbs. At the top of the chamber G is a hole, which is provided with a movable cover, *g*, for the purpose of allowing air or steam to escape when desired, and if necessary may be used as a draft passage in starting the fire.

In Fig. 2 I have represented a slight modification of the apparatus of Fig. 1, wherein the gas and steam or vapor generators are arranged on the surface of the ground. Under this modification I provide a furnace, B, for burning charcoal, at the top of which is a vapor-generator, C. A pipe, $a^1$, leads from the furnace B and conducts the gas generated therein into the chamber G, and a pipe, $a^2$, leads from the generator C into the pipe $a^1$, and conducts the vapor or steam thereinto. The pipes $a^1$ and $a^2$ are provided with a valve, as at *b* and *c*, for regulating the discharge from the two generators.

It will be seen that I mix the gas and vapor in pipe $a^1$ on their way into the chamber G, and before they enter the latter, thus thoroughly charging the watery particles with the gas.

Figure 3:
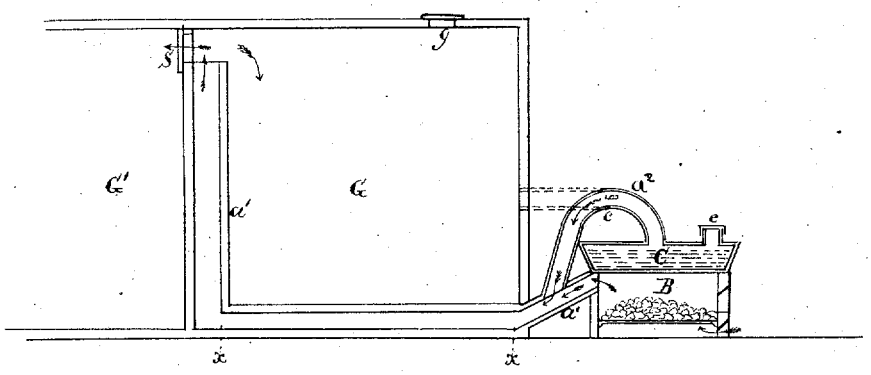

In Fig. 3 I show a gas-generating furnace, B, and a vapor-generator, C, with pipes $a^1$ and $a^2$ leading into the chamber G, which parts are constructed and operate substantially as shown in Fig. 1. Under this modification the pipe $a^1$ is carried along the floor of the chamber G, between the points *x x*, and upward nearly to the roof of this chamber, where the gas and vapor escape into the chamber. Instead of the vapor-pipe $a^2$ entering the gas-pipe $a^1$ this pipe $a^2$ may be carried directly into the chamber G, as shown in dotted lines, so that the vapor will not mix with the gas until they both get into this chamber G, and instead of conducting the gas and vapor together entirely through the cooling medium between the points *x x*, the gas alone may be conducted through this cooling medium, and the vapor introduced into the gas-pipe near its outlet, or at any other suitable point. I have also represented in Fig. 3 two hardening or curing chambers, G G′, with a communication, S, between their division-wall, which may be provided with a valve, so that these chambers can be charged together when desired. In this way any desired number of curing-chambers may communicate with the generators.

Figure 4:
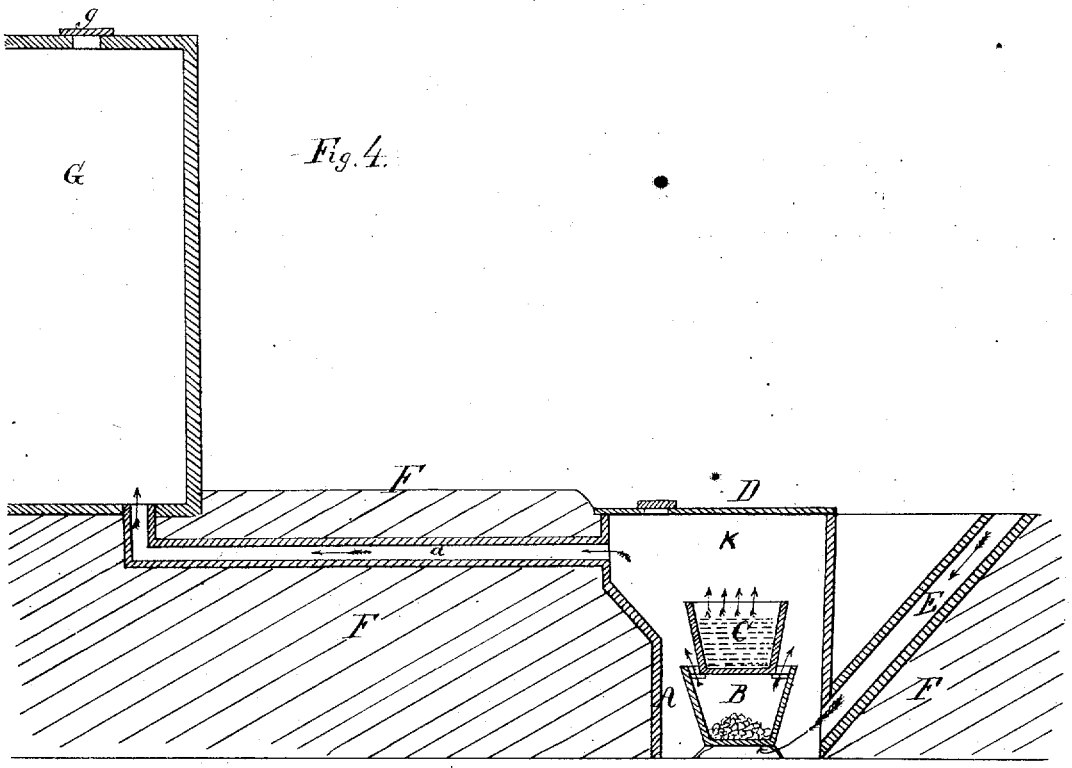

In Fig. 4 I have represented an apparatus substantially like the one described under Fig. 1, with this exception. The gas-pipe *a* in this instance is carried beneath the surface of the ground F a considerable distance before it enters the hardening or curing chamber G, in lieu of carrying the gas-pipe along the floor of said chamber, as shown in Fig. 3, so that the earth thus surrounding the gas-pipe, as in Fig. 4, will serve as a cooling medium for it, as well as the gas and vapor, which are conducted through it to the hardening or curing chamber G.

I have thus described four different forms of apparatus with which my hardening process may be conducted; but other modifications of their construction may be employed, as convenience may dictate, without altering their principle of operation. I do not, therefore, confine myself strictly to the precise forms and arrangements herein shown.

What I claim is—

1. The apparatus, substantially as described, for mingling carbonic-acid gas with vapors of fluids in a chamber containing the material to be indurated, as set forth.

2. The combination, with an indurating or curing chamber, G, of a carbonic-acid-gas generator and a vapor or steam generator, substantially as described.

3. The combination of a gas and vapor mixing pipe or passage, gas-generator, vapor-generator, and indurating or curing chamber, substantially as described.

4. Introducing into the curing-chamber steam and carbonic-acid gas, the latter being subjected to a cooling process during its passage from the furnace to the curing-chamber, substantially as described.

Witness my hand in the matter of my application for the reissue of the patent granted me April 1, 1873, for improvement in the manufacture of artificial stone.

JAMES L. ROWLAND.

Witnesses:
HENRY B. FITCH,
R. H. RANSOM.